United States Patent [19]
Lee

[11] Patent Number: 5,906,002
[45] Date of Patent: May 18, 1999

[54] METHOD AND APPARATUS FOR SAVING AND RESTORING THE CONTEXT OF REGISTERS USING DIFFERENT INSTRUCTION SETS FOR DIFFERENT SIZED REGISTERS

[75] Inventor: Van Hoa Lee, Cedar Park, Tex.

[73] Assignee: International Business Machines Corporation, Armonk, N.Y.

[21] Appl. No.: 08/799,589

[22] Filed: Feb. 10, 1997

[51] Int. Cl.[6] .................................................. G06F 12/00
[52] U.S. Cl. ..................... 711/171; 365/800.23; 365/566; 365/500
[58] Field of Search ............................. 395/566, 800.23, 395/500; 711/171

[56] References Cited

U.S. PATENT DOCUMENTS

| | | | |
|---|---|---|---|
| 5,201,039 | 4/1993 | Sakamura | 395/375 |
| 5,430,364 | 7/1995 | Powel et al. | 395/500 |
| 5,430,864 | 7/1995 | Powell et al. | 395/500 |
| 5,481,734 | 1/1996 | Yoshida | 395/775 |
| 5,542,060 | 7/1996 | Yoshida | 395/375 |
| 5,550,993 | 8/1996 | Ehlig | 395/375 |
| 5,590,352 | 12/1996 | Ehlig et al. | 395/570 |
| 5,685,009 | 11/1997 | Blumsrey et al. | 395/800.23 |

OTHER PUBLICATIONS

IBM Technical Disclosure Bulletin, "Software Test Coverage Measurement," vol. 39, No. 08, Aug. 1996.
IBM Technical Disclosure Bulletin, "Technique for Reducing the Number of Registers Saved at a Context SWAP," vol. 33, No. 3A, Aug. 1990.

Primary Examiner—Tod R. Swann
Assistant Examiner—David Langjahr
Attorney, Agent, or Firm—Volel Emile; Jack V. Musgrove; Andrew J. Dillon

[57] ABSTRACT

A method of saving the context of a plurality of registers in a computer processor, requires determining whether the processor registers have a first size or a second size, and saving the contents of the registers in a buffer using a first set of instructions if the processor registers have the first size (e.g., 64 bits), and using a second set of instructions if the processor registers have the second size (e.g., 32 bits). If the processor registers having the first size, the method may further include the steps of determining whether the processor is operating in a first mode (e.g., 64-bit mode) or a second mode (e.g., 32-bit mode), and then saving the contents of the registers in the buffer using the first set of instructions if the processor is operating in the first mode, but using the second set of instructions if the processor is operating in the second mode. The method can additionally determine whether the processor registers have a third size, and use a third set of instructions if the processor registers have the third size. Similarly, if the processor can operate in a third mode, then the contents of the registers may be saved using a third set of instructions if the processor is operating in the third mode. The context-saving code uses a portion of the registers for its processing, by initially saving a first portion of the registers in the buffer, and thereafter using the first portion of the registers to temporarily store the contents of other registers. The contents of the other registers are later restored from the first portion of the registers, and then saved in the buffer.

18 Claims, 3 Drawing Sheets

METHOD AND APPARATUS FOR SAVING AND RESTORING THE CONTEXT OF REGISTERS USING DIFFERENT INSTRUCTION SETS FOR DIFFERENT SIZED REGISTERS

BACKGROUND OF THE INVENTION

1. Field of the Invention

The present invention generally relates to computer systems, and more particularly to a method of saving information from the central processor of the computer.

2. Description of the Prior Art

The basic structure of a conventional computer system 10 is shown in FIG. 1. The heart of computer system 10 is a central processing unit (CPU) or processor 12 which is connected to several peripheral devices, including input/output (I/O) devices 14 (such as a display monitor and keyboard) for the user interface, a permanent memory device 16 (such as a hard disk or floppy diskette) for storing the computer's operating system and user programs, and a temporary memory device 18 (such as random access memory or RAM) that is used by processor 12 in carrying out program instructions. Processor 12 communicates with the peripheral devices by various means, including a bus 20 or a direct channel 22. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter connected to processor 12 might be used to control a video display monitor. Computer system 10 also includes firmware 24 whose primary purpose is to seek out and load an operating system from one of the peripherals (usually permanent memory device 16) whenever the computer is first turned on.

An illustrative embodiment of processor 12 is further shown in FIG. 2, which depicts the architecture for a PowerPC™ microprocessor manufactured by International Business Machines Corp. In this embodiment, processor 12 operates according to reduced instruction set computing (RISC) techniques, and is a single integrated circuit superscalar microprocessor. The system bus 20 is connected to a bus interface unit (BIU) 30 of processor 12. It is understood that bus 20, as well as various other connections described, include more than one line or wire, e.g., the bus could be a 32-bit bus. BIU 30 is connected an instruction cache 32 and a data cache 34. The output of instruction cache 32 is connected to a sequencer unit 36. In response to the particular instructions received from instruction cache 32, sequencer unit 36 outputs instructions to other execution circuitry of processor 12, including six execution units, namely, a branch unit 38, a fixed-point unit A (FXUA) 40, a fixed-point unit B (FXUB) 42, a complex fixed-point unit (CFXU) 44, a load/store unit (LSU) 46, and a floating-point unit (FPU) 48.

The inputs of FXUA 40, FXUB 42, CFXU 44 and LSU 46 also receive source operand information from general-purpose registers (GPRs) 50 and fixed-point rename buffers 52. The outputs of FXUA 40, FXUB 42, CFXU 44 and LSU 46 send destination operand information for storage at selected entries in fixed-point rename buffers 52. CFXU 44 further has an input and an output connected to special-purpose registers (SPRs) 54 for receiving and sending source operand information and destination operand information, respectively. An input of FPU 48 receives source operand information from floating-point registers (FPRs) 56 and floating-point rename buffers 58. The output of FPU 48 sends destination operand information to selected entries in floating-point rename buffers 58. Processor 12 may include other registers, such as configuration registers, memory management registers, exception handling registers, and miscellaneous registers, which are not shown. Processor 12 carries out program instructions (from a user application or the operating system) by routing the instructions and data to the appropriate execution units, buffers and registers, and by sending the resulting output to the memory device 18, or some output device such as a display console.

During operation of the computer system, it frequently becomes necessary to save the context of the registers, for example, when swapping out processes (multi-tasking), or handling exceptions. The manner in which the context is saved depends upon size of the registers, e.g., whether they are 32-bit registers, 64-bit registers operating in 64-bit mode, or 64-bit registers operating in 32-bit mode, because different instructions must be used to save the information depending upon the nature of the registers. Accordingly, separate sets of code are required to perform the context-saving routine for different register architectures. The operating system must examine the processor version register (PVR, one of the configuration registers mentioned above) in order to determine which set of codes are to be used throughout its operation. At a given processor architecture version, whenever a new processor is available, the operating system must be modified to recognize the new PVR value since it may not be known previously. It would, therefore, be desirable to devise a method of saving a processor's register context which can be used for any processor version, present or future, of a given processor architecture version. Furthermore, when the processor architecture is changed to a newer version to include larger register size, it is desirable that the method could be easily expanded to cover the larger size registers with newly defined instructions which can handle them.

SUMMARY OF THE INVENTION

It is therefore one object of the present invention to provide a routine for saving the register context of a computer processor.

It is another object of the present invention to provide a context-saving routine that can be used with processors having different register architectures.

It is yet another object of the present invention to provide such a context-saving routine that is adaptable to future processor versions of a given processor architecture or expandable to future changes of the processor architecture.

The foregoing objects are achieved in a method of saving the context of a plurality of registers in a computer processor, generally comprising the steps of determining whether the processor registers have a first size or a second size, and saving the contents of the registers in a buffer using a first set of instructions if the processor registers have the first size, and using a second set of instructions if the processor registers have the second size. If the processor registers having the first size, the method may further include the steps of determining whether the processor is operating in a first mode or a second mode, and then saving the contents of the registers in the buffer using the first set of instructions if the processor is operating in the first mode, but using the second set of instructions if the processor is operating in the second mode. In an exemplary embodiment, the first size is 64 bits and the second size is 32 bits, and the saving step is accomplished using either a first instruction in the first instruction set which retrieves 64 bits, or using a second instruction in the second instruction set which retrieves 32 bits. The method can additionally determine whether the processor registers have a third size, and use a third set of instructions if the processor registers have the third size. Similarly, if the processor can operate in a third mode, then the contents of the registers may be saved using a third set of instructions if the processor is operating in the third mode. The context-saving code can use a portion of the registers for its processing, such as by initially saving a first portion of the registers in the buffer, and thereafter using the first portion of the registers to temporarily store the contents of other registers. In such a case, the contents of the other registers can be later restored from the first portion of the registers, and thereafter saved in the buffer.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
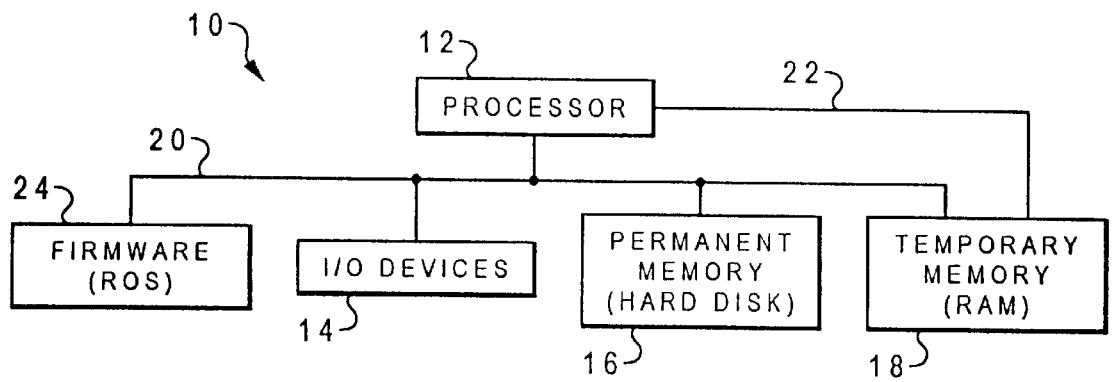
FIG. 1 is a block diagram of a conventional computer system.
Figure 2:
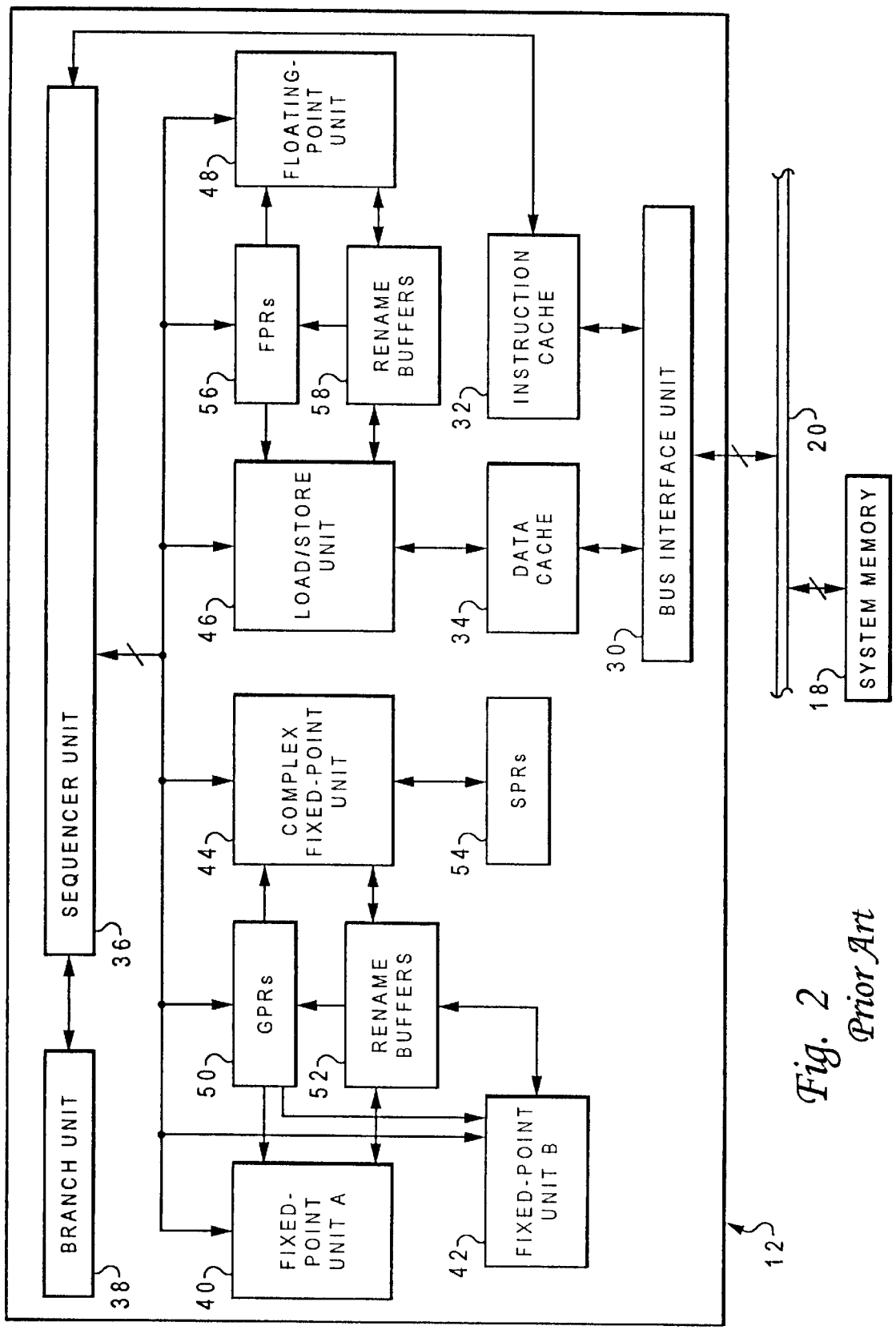
FIG. 2 is a block diagram of a conventional computer processor, depicting execution units, buffers and registers.

The present invention is directed to a method of saving the context of a computer processor's register. The computer system's hardware and the processor may include the various components shown in FIGS. 1 and 2, but the computer system is not necessarily conventional, i.e., it could include new hardware components as well, or have a novel interconnection architecture for existing components.

Figure 3:
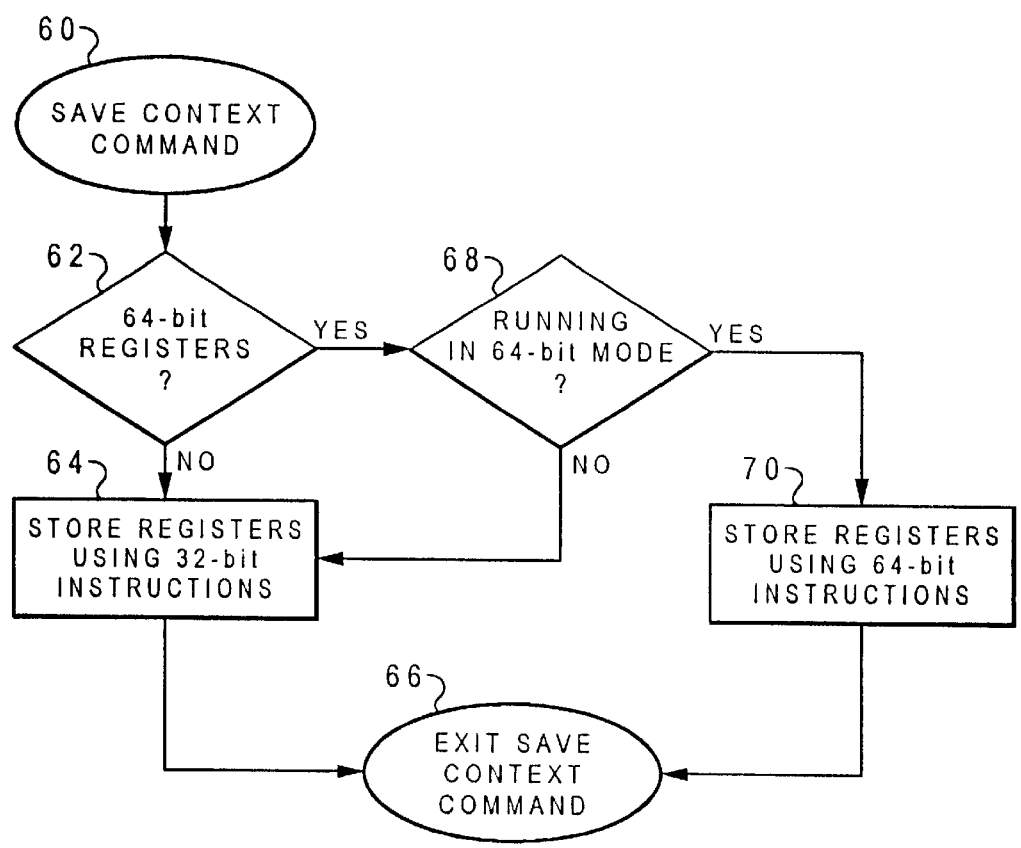
FIG. 3 is a flow chart depicting the general steps performed according to the present invention.

The general method of the present invention is shown in FIG. 3. Upon issuance of the command by the operating system to save the current register context (60), the context-saving code first checks to see if the processor registers are of a particular size, e.g., 64 bits (62). If not, then the routine simply uses the storage instructions for saving the contents of the registers which are associated with the other known processor size, e.g., 32 bits (64), and then exits the context-saving routine (66). If, however, the processor registers are of the larger 64-bit size, then a further determination is made as to whether the processor is using all of the register bits, i.e., operating in a 64-bit mode, or whether the processor is using a smaller number of the register bits, i.e., operating in a 32-bit mode (68). If the processor is operating in the lower 32-bit mode, then the contents of the registers are saved using the 32-bit storage instructions (64). Only if the processor has 64-bit registers and if it is operating in 64-bit mode will the context-saving routine use the 64-bit storage instructions (70).

Those skilled in the art will appreciate that this approach can be expanded for other types of processor architectures. For example, the context-saving code could be adapted to save the contents of 16-bit registers as well as 32-bit or 64-bit registers, using a third set of storage instructions. Similarly, if a 64-bit processor were designed to run in three modes (64-bit, 32-bit and 16-bit), then the context-saving code could examine a 64-bit processor to see which of the three modes it is operating in.

Figure 4:
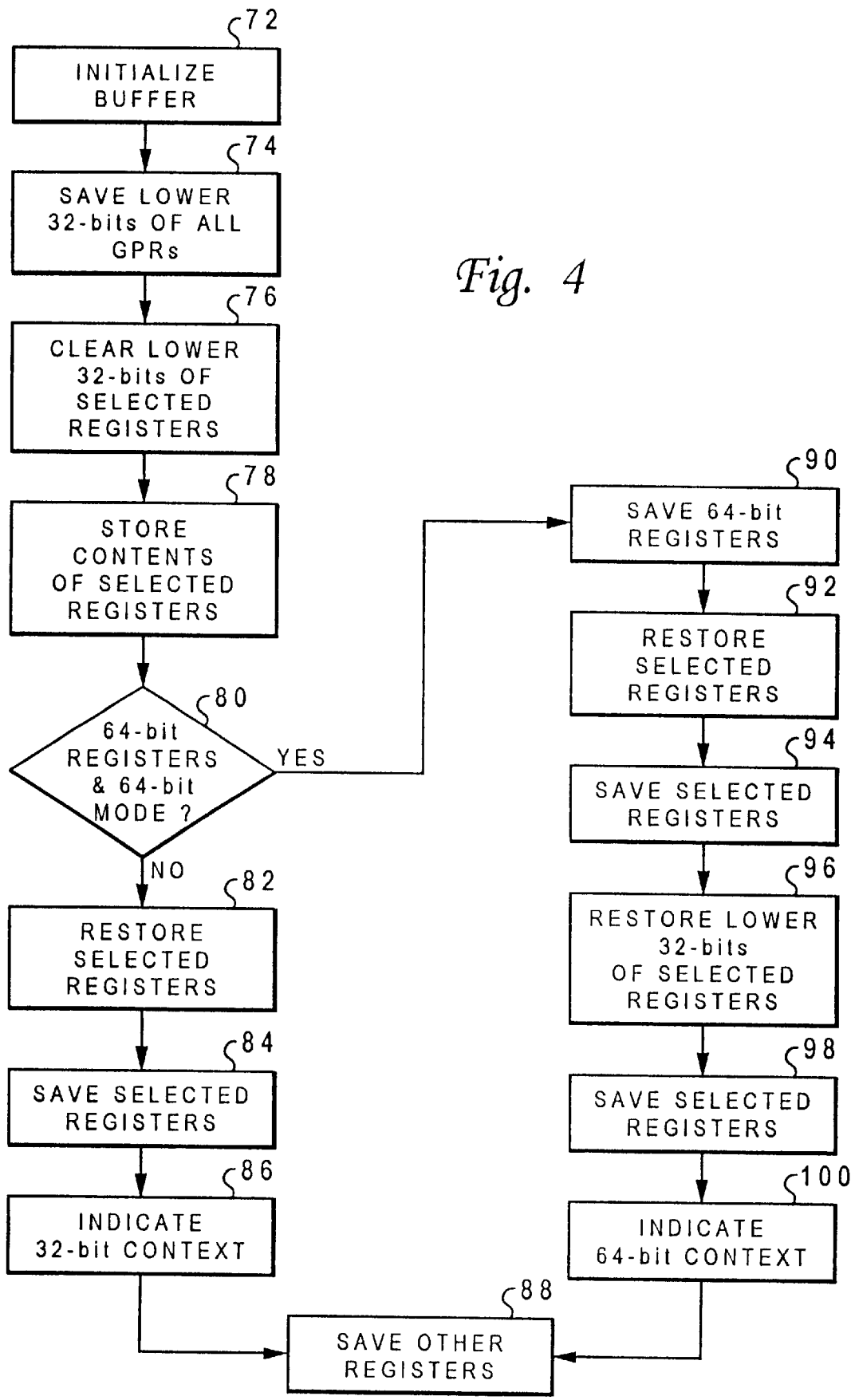
FIG. 4 is a flow chart depicting more specific steps performed according to the present invention for a PowerPC™ processor.

A more detailed procedure for saving register context according to the present invention is shown in FIG. 4. The flow chart of FIG. 4 depicts the steps used in saving the context of a processor, such as the PowerPC™ processor, which can have either 32-bit or 64-bit registers and which, if having 64-bit registers, can operate in either a 32-bit mode or a 64-bit mode. The procedure begins by initializing the buffer used to store the register context, i.e., by defining offsets within the buffer for each register to be saved (72). Registers which may be 64 bits long should have the offsets doubleword-aligned. In this example, only the GPRs, the condition register (CR), the fixed-point exception register (XER), and the DSISR register are saved. After initialization, the lower 32-bits of all the GPRs are saved in the buffer (74) using a 32-bit storage instruction ("stw"). The lower 32-bits of certain registers are then cleared, to be used by the context-saving code, e.g., three of the general purpose registers (76). The contents of certain other registers (such as the CR and XER registers) are stored in these other available registers (78).

The context-saving code is then prepared to determine whether the processor is 64-bits or 32-bits and, if 64-bits, to further determine what mode it is operating in. In this example the determination begins by examining the overflow field in the XER register, which can be used to indicate if the processor is both 64-bits and in 64-bit mode (80). If this is not the case, then the processor is either 32-bits, or is 64-bits operating is 32-bit mode but, in either case, the 32-bit storage instructions previously executed were sufficient to save the register context of the GPRs, and so all that remains is for the other registers to be saved. First, the CR and XER registers are restored (82), and then these registers, along with the DSISR register, are saved using the 32-bit storage instruction (84). A flag in the buffer may then be set (86) indicating a 32-bit context, to be used for saving other registers (88) as discussed further below.

Returning to step 80, if it is determined that the processor is 64-bits and operating in 64-bit mode, then the 64-bit registers are saved to the buffer (90) using a 64-bit storage instruction ("std"). For example, all of the GPRs, except the three that were set aside for local storage, are saved. Then, the CR and XER registers must be restored (92) and these registers along with the DSISR register saved (94), as with the other branch of FIG. 4. Next, since the lower 32-bits of the three GPRs used by the context-saving code have been modified, they must also be restored (96) prior to being saved (98). The flag in the buffer may then be set (100) indicating a 64-bit context. Other registers, such as the SPRs, can then be easily saved based upon the setting of the flag stored in the buffer (88). This flag can also be used by the code which restores the saved context from the buffer back to the registers.

Assembly language code for implementing the foregoing example is included herewith as an appendix. All rights to any copyright subsisting in this code which may exist separate and apart from any patentable subject matter are reserved.

The foregoing method provides a solution for saving the context of a computer processor's registers which efficiently performs the context-saving operation regardless of the particular register architecture and mode of operation. Additionally, it can easily be adapted to support future register architectures as well as existing ones. Finally, this approach does not cause or use any system exception.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

APPENDIX

```
# Define offsets within the buffer for each register to be saved. Here,
# Only the general purpose register R0 to R31, Condition register CR,
# fixed point exception register XER, and DSISR register are shown in
# this example for illustration purpose. Registers which may be 64-bit
# long should have the offsets doubledword-aligned.
# This assumes the system memory buffer address is stored in GPR R3.
# It also assumes that the address is doubleword-aligned.
            .set    R0sv,0
            .set    R1sv,8
            .set    R2sv,16
            .set    R3sv,24
            .set    R4sv,32
            .set    R5sv,40
            .set    R6sv,48
            .set    R7sv,56
            .set    R8sv,64
            .set    R9sv,72
            .set    R10sv,80
            .set    R11sv,88
            .set    R12sv,96
            .set    R13sv,104
            .set    R14sv,112
            .set    R15sv,120
            .set    R16sv,128
            .set    R17sv,136
            .set    R18sv,144
            .set    R19sv,152
            .set    R20sv,160
            .set    R21sv,168
            .set    R22sv,176
            .set    R23sv,184
            .set    R24sv,192
            .set    R25sv,200
            .set    R26sv,208
            .set    R27sv,216
            .set    R28sv,224
            .set    R29sv,232
            .set    R30sv,240
            .set    R31sv,248
            .set    CRsv,256
            .set    XERsv,260
            .set    DSISRsv,264
            .set    MODE,268
# R3 is the address of the buffer. Start saving the lower 32-bit of
# all general purposed registers
            stw     R0,R0sv(R3)
            stw     R1,R1sv(R3)
            stw     R2,R2sv(R3)
            stw     R3,R3sv(R3)
            stw     R4,R4sv(R3)
            stw     R5,R5sv(R3)
            stw     R6,R6sv(R3)
            stw     R7,R7sv(R3)
            stw     R8,R8sv(R3)
            stw     R9,R9sv(R3)
            stw     R10,R10sv(R3)
            stw     R11,R11sv(R3)
            stw     R12,R12sv(R3)
            stw     R13,R13sv(R3)
            stw     R14,R14sv(R3)
            stw     R15,R15sv(R3)
```

APPENDIX-continued

```
            stw     R16,R16sv(R3)
            stW     R17,R17sv(R3)
            stw     R18,R18sv(R3)
            stw     R19,R19sv(R3)
            stw     R20,R20sv(R3)
            stw     R21,R21sv(R3)
            stw     R22,R22sv(R3)
            stw     R23,R23sv(R3)
            stw     R24,R24sv(R3)
            stw     R25,R25sv(R3)
            stw     R26,R26sv(R3)
            stw     R27,R27sv(R3)
            stw     R28,R28sv(R3)
            stw     R29,R29sv(R3)
            stw     R30,R30sv(R3)
            stw     R31,R31sv(R3)
# Clear lower 32-bit of registers R29 to R31 to zero.
            oris    R29,R29,0 x FFFF
            ori     R29,R29,0 x FFFF
            xoris   R29,R29,0 x FFFF
            xori    R29,R29,0 x FFFF
            oris    R30,R30,0 x FFFF
            ori     R30,R30,0 x FFFF
            xoris   R30,R30,0 x FFFF
            xori    R30,R30,0 x FFFF
            oris    R31,R31,0 x FFFF
            ori     R31,R31,0 x FFFF
            xoris   R31,R31,0 x FFFF
            xori    R31,R31,0 x FFFF
# Find out the content of Condition Register field CR0 and CR1, and save
# them into the register R31 as shown in the code.
            .set    cr0,0
            .set    cr1,1
save_cr0    blt     lt0
            bgt     gt0
            beq     eq0
            bso     so0
            b       cr0_saved
so0         oris    R31,R31,0 x 1000
            b       cr0_saved
eq0         oris    R31,R31,0 x 2000
            b       save_cr0 + 12
gt0         oris    R31,R31,0 x 4000
            b       save_cr0 + 8
lt0         oris    R31,R31,0 x 8000
            b       save_cr0 + 4
cr0_saved
save_cr1    blt     cr1,lt1
            bgt     cr1,gt1
            beq     cr1,eq1
            bso     cr1,so1
            b       cr1_saved
sol         oris    R31,R31,0 x 0100
            b       cr1_saved
eq1         oris    R31,R31,0 x 0200
            b       save_cr1 + 12
gt1         oris    R31,R31,0 x 0400
            b       save_cr1 + 8
lt1         oris    R31,R31,0 x 0800
            b       save_cr1 + 4
cr1_saved:
# Save XER(0-3) into CR1 field and clear XER(0-3) to zero.
            mcrxr   cr1
# Prepare to determine if the processor is 64-bit and in 64-bit mode.
            oris    R30,R30,0 x 8000    #
            nego    R30,R30             # Negate to generate SO
                                        and OV.
            neg     R30,R30             # Restore R30's upper
                                        32-bit in case
# If the processor is 64-bit one and is in 64-bit mode, then OV can't be
# set since R30 was not the most negative 64-bit number in the first
# negation. Equivalently, if OV = 0, then the processor must be a 64-bit
# one and in 64-bit mode.
            mcrxr   cr0                 # Move OV to CR0 for
                                        testing.
            bng     is_64bit
# Here, our code has determined that only 32-bit register-context needed
# to be saved since the processor is a 32-bit one, or the processor is
# a 64-bit one and running in 32-bit mode so that upper 32-bit of any
```

APPENDIX-continued

```
# 64-bit register is not part of the context to be saved.
           mcrf      cr0,cr1           # Get original XER(0–3)
                                         into
           mfcr      R29               # R29
           rlwinm    R29,R29,0,0,3     #
           mfxer     R30               # Get original
                                         XER(4–31) into
           rlwinm    R30,R30,0,4,31    # R30
           or        R30,R30,R29       # Reconstruct original
                                         XER value
           stw       R30,XERsv(R3)     # Save it
           mtcrf     0 × C0,R31        # Restore condition
                                         register CR
           mfcr      R29               # Get it into R29
           stw       R29,CRsv(R3)      # Save it
           mfdsisr   R29               # Get DSISR into R29
           stw       R29,DSISRsv(R3)   # Save it
           addi      R29,R0,0          # Indicate 32-bit context.
           stw       R29,MODE(R3)      #
           b         context_saved     # Done!
# In the following, the context is 64-bit long. The processor is 64-bit
# one and in 64-bit mode. Use std instruction to save 64-bit registers.
is_64bit
           std       R0,R0sv(R3)
           std       R1,R1sv(R3)
           std       R2,R2sv(R3)
           std       R3,R3sv(R3)
           std       R4,R4sv(R3)
           std       R5,R5sv(R3)
           std       R6,R6sv(R3)
           std       R7,R7sv(R3)
           std       R8,R8sv(R3)
           std       R9,R9sv(R3)
           std       R10,R10sv(R3)
           std       R11,R11sv(R3)
           std       R12,R12sv(R3)
           std       R13,R13sv(R3)
           std       R14,R14sv(R3)
           std       R15,R15sv(R3)
           std       R16,R16sv(R3)
           std       R17,R17sv(R3)
           std       R18,R18sv(R3)
           std       R19,R19sv(R3)
           std       R20,R20sv(R3)
           std       R21,R21sv(R3)
           std       R22,R22sv(R3)
           std       R23,R23sv(R3)
           std       R24,R24sv(R3)
           std       R25,R25sv(R3)
           std       R26,R26sv(R3)
           std       R27,R27sv(R3)
           std       R28,R28sv(R3)
# Now, save XER and CR registers
           mcrf      cr0,cr1           # Get original XER(0–3)
                                         into
           mfcr      R28               # R28
           rlwinm    R28,R28,0,0,3     #
           mfxer     R27               # Get original
                                         XER(4–31) into
           rlwinm    R27,R27,0,4,31    # R27
           or        R27,R27,R28       # Reconstruct original
                                         XER value
           stw       R27,XERsV(R3)     # Save it
           mtcrf     0 × C0,R31        # Restore condition
                                         register CR
           mfcr      R28               # Get it into R28
           stw       R28,CRsv(R3)      # Save it
           mfdsisr   R28               # Get DSISR into R28
           stw       R28,DSISRsV(R3)   # Save it
# Lower 32-bit of R29, R30, and R31 were modified. Need to restore
# them before saving.
           oris      R29,R29,0 × FFFF  # Clear lower 32-bit
                                         of R29
           ori       R29,R29,0 × FFFF  #
           xoris     R29,R29,0 × FFFF  #
           xori      R29,R29,0 × FFFF  #
           oris      R30,R30,0 × FFFF  # Clear lower 32-bit
                                         of R30
           ori       R30,R30,0 × FFFF  #
```

APPENDIX-continued

```
           xoris     R30,R30,0 × FFFF  #
           xori      R30,R30,0 × FFFF  #
           oris      R31,R31,0 × FFFF  # Clear lower 32-bit
                                         of R31
           ori       R31,R31,0 × FFFF  #
           xoris     R31,R31,0 × FFFF  #
           xori      R31,R31,0 × FFFF  #
           lwz       R28,R29sv(R3)     # Restore R29
           or        R29,R29,R28       #
           lwz       R28,R30sv(R3)     # Restore R30
           or        R30,R30,R28       #
           lwz       R28,R31sv(R3)     # Restore R31
           or        R31,R31,R28       #
           std       R29,R29sv(R3)     # Save them
           std       R30,R30sv(R3)     #
           std       R31,R31sv(R3)     #
           addi      R29,R0,1          # Indicate 64-bit context.
           stw       R29,MODE(R3)      #
context_saved
# From here, additional special purpose registers can be saved using
# either "stw" or "std" instruction based upon the setting of the MODE
# flag stored in the buffer. The Mode flag is also helpful for the code
# which restores the save context.
```

I claim:

1. A method of saving the context of a plurality of registers in a computer processor, comprising the steps of:

providing an operating system for the computer processor having first and second sets of instructions for saving contents of the registers based on a size of a register architecture of the processor;

determining whether the register architecture of the processor has a first size or a second size; and saving the contents of the registers in a buffer using the first set of instructions if the register architecture of the processor has the first size, and using the second set of instructions if the register architecture of the processor has the second size.

2. The method of claim 1 further comprising the steps of:

determining, if the register architecture of the processor has the first size, whether the processor is operating in a first mode or a second mode; and saving the contents of the registers in the buffer using the first set of instructions if the processor is operating in the first mode, but using the second set of instructions if the processor is operating in the second mode.

3. The method of claim 1 wherein the first size is 64-bits and the second size is 32-bits, and said saving step is accomplished using either a first instruction in the first instruction set which retrieves 64-bits, or using a second instruction in the second instruction set which retrieves 32-bits.

4. The method of claim 1 wherein:

said determining step further determines whether the register architecture of the processor has a third size; and said saving step further stores the contents of the registers in the buffer using a third set of instructions if the register architecture of the processor has the third size.

5. The method of claim 1 wherein said determining step includes the steps of:

initially saving a first portion of the registers in the buffer; and thereafter using the first portion of the registers to temporarily store the contents of other registers.

6. The method of claim 1 wherein said saving step includes the step of first saving the contents of a plurality of the registers using a storage instruction which assumes that the register architecture of the processor has said second size.

7. The method of claim 2 wherein:

the first size is 64 bits and the second size is 32 bits;

the first mode is a 64-bit mode and the second mode is a 32-bit mode; and said saving step is accomplished using a first storage instruction in the first instruction set which retrieves 64 bits, or using a second storage instruction in the second instruction set which retrieves 32 bits.

8. The method of claim 2 wherein:

said step of determining the mode of the processor further determines whether the processor is operating in a third mode; and saving the contents of the registers in the buffer using a third set of instructions if the processor is operating in the third mode.

9. The method of claim 5 wherein said step of saving the contents of the registers includes the steps of:

restoring the contents of the other registers from the first portion of the registers; and thereafter saving the contents of the other registers in the buffer.

10. A computer system comprising:

a processor having a plurality of registers and a register architecture;

a buffer for receiving the contents of said registers; and a memory device connected to said processor and including context-saving code for determining whether said register architecture has a first size or a second size, and saving the contents of said registers in said buffer using a first set of instructions located in said memory device if said register architecture has said first size, and using a second set of instructions located in said memory device if said register architecture has said second size.

11. The computer system of claim 10 wherein, if said register architecture has said first size, said context-saving code further determines whether said processor is operating in a first mode or a second mode, and saves said contents of said registers in said buffer using said first set of instructions if said processor is operating in said first mode, but using said second set of instructions if said processor is operating in said second mode.

12. The computer system of claim 10 wherein said register architecture has a size selected from the group consisting of 64-bit registers and 32-bit registers, and said context-saving code includes a first instruction in said first instruction set which retrieves 64 bits, and a second instruction in said second instruction set which retrieves 32 bits.

13. The computer system of claim 10 wherein said context-saving code further determines whether said processor registers have a third size, and saves said contents of said registers in said buffer using a third set of instructions if said processor registers have said third size.

14. The computer system of claim 10 wherein said context-saving code further initially saves a first portion of said registers in said buffer, and thereafter uses said first portion of said registers to temporarily store the contents of other registers.

15. The computer system of claim 10 wherein said context-saving code saves the contents of a plurality of said registers using a storage instruction which assumes that said processor registers have said second size.

16. The computer system of claim 11 wherein:

said first size is 64 bits and said second size is 32 bits;

said first mode is a 64-bit mode and said second mode is a 32-bit mode; and said context-saving code uses a first storage instruction in said first instruction set which retrieves 64 bits, or uses a second storage instruction in said second instruction set which retrieves 32 bits.

17. The computer system of claim 11 wherein said context-saving code further determines whether said processor is operating in a third mode, and saves said contents of said registers in said buffer using a third set of instructions if said processor is operating in said third mode.

18. The computer system of claim 14 wherein said context-saving code restores the contents of said other registers from said first portion of said registers, and thereafter saves said contents of said other registers in said buffer.

* * * * *